C. H. JONES.
POWER TRANSMISSION DEVICE.
APPLICATION FILED DEC. 23, 1915.
1,198,236.
Patented Sept. 12, 1916.
2 SHEETS—SHEET 1.
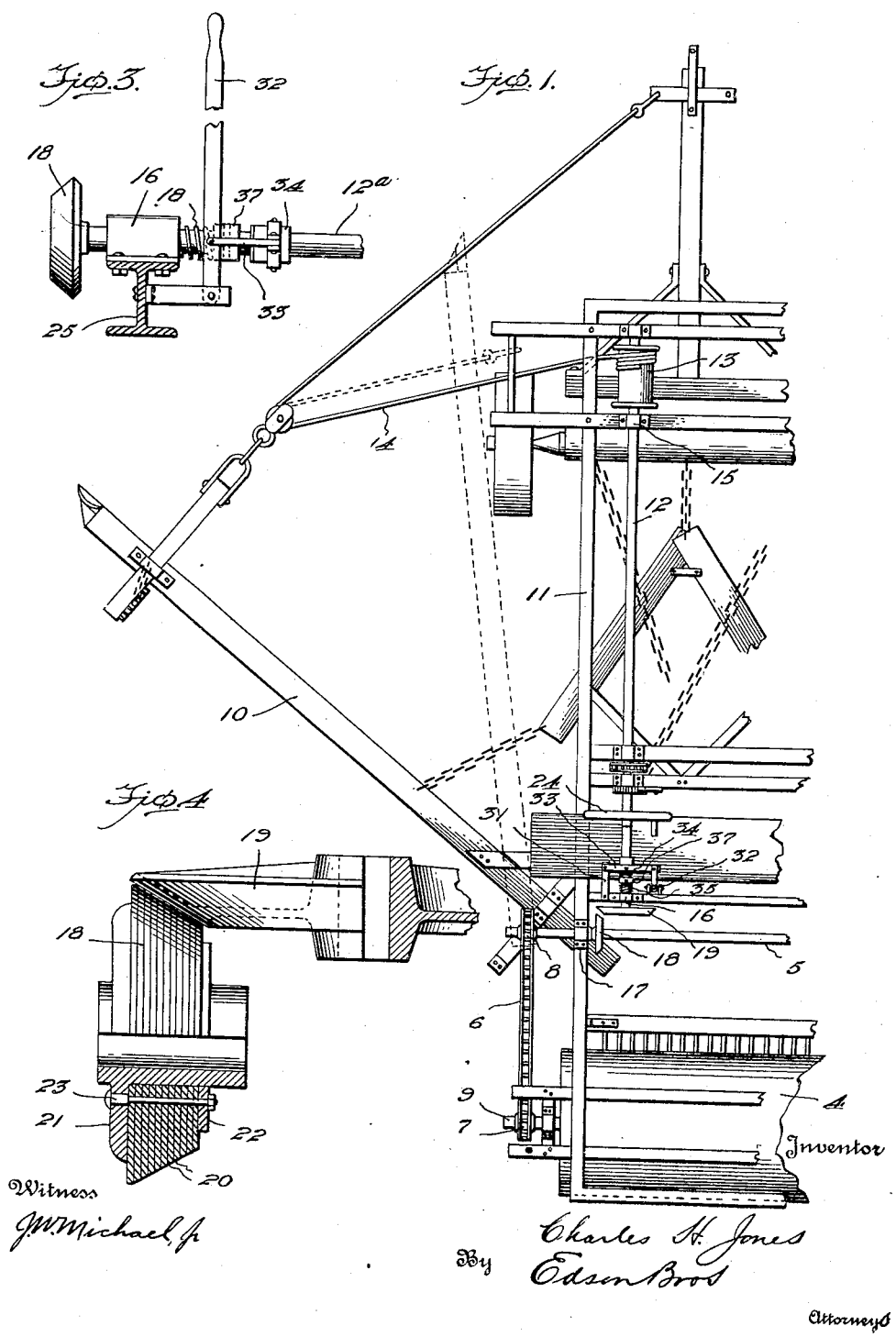

C. H. JONES.
POWER TRANSMISSION DEVICE.
APPLICATION FILED DEC. 23, 1915.
1,198,236.
Patented Sept. 12, 1916.
2 SHEETS—SHEET 2.
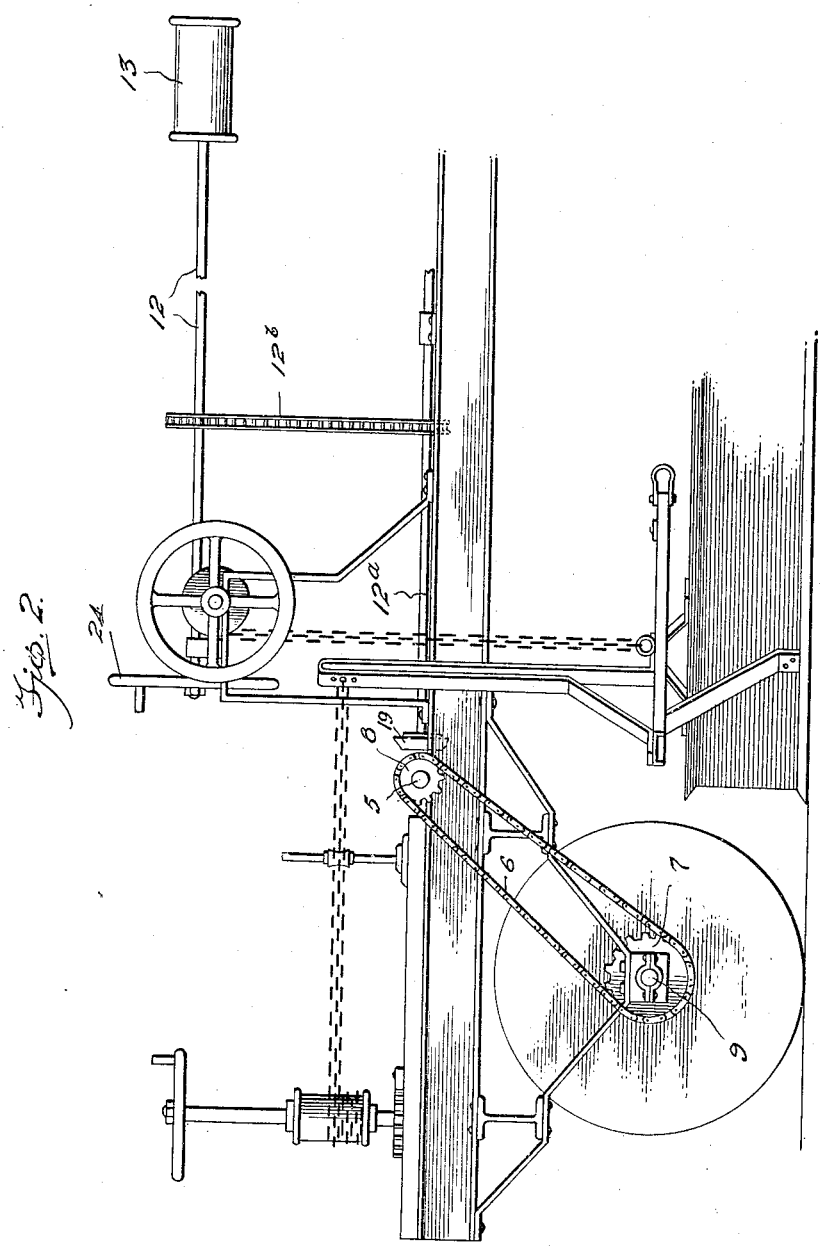
Witness
J. W. Michael, Jr.
Inventor
Charles H. Jones
By Edson Bros
Attorneys

UNITED STATES PATENT OFFICE.

CHARLES H. JONES, OF GALVA, ILLINOIS.

POWER-TRANSMISSION DEVICE.

1,198,236.  Specification of Letters Patent.  Patented Sept. 12, 1916.

Application filed December 23, 1915. Serial No. 68,400.

*To all whom it may concern:*

Be it known that I, CHARLES H. JONES, a citizen of the United States, residing at Galva, in the county of Henry and State of Illinois, have invented certain new and useful Improvements in Power-Transmission Devices; and I do hereby declare the following to be a full, clear, and exact description of the invention, such as will enable others skilled in the art to which it appertains to make and use the same.

This invention is a device whereby power may be transmitted from a driving element to a driven element, and it is particularly applicable for use in road leveling machines.

In certain classes of road leveling machines, such as that illustrated and described in my co-pending application, Serial Number 27,385, which was filed May 11, 1915, a frame is provided with one or more scraper beams which are adjustably mounted thereon. These beams are heavy and cumbersome to shift to the various angular positions required for operation upon a road surface. After the beams have scraped the material of the road bed, a roller may be employed to harden the road surface.

The purpose of this invention is to utilize the power from a power element, such as a traction wheel or roller, or any equivalent device to rotate a driven shaft which carries a winding drum for the purpose of changing the angular position of the scraper beams and to maintain the beams in their adjusted positions; also to elevate the beams to facilitate the transportation of the machine.

Broadly stated, the invention comprises a driving shaft and a driven shaft coöperating with means to shift one of the shafts whereby power may be transmitted thereto through novel power transmitting instrumentalities.

In the drawings, illustrating an embodiment of the invention, and which it is to be understood are for the purposes of illustration only,—Figure 1 is a plan view of a part of a machine illustrating the invention applied thereto. Fig. 2 is a side elevation of a part of the device of Fig. 1. Fig. 3 is a side elevation, partly in section, of the lever which actuates the driven beam shaft. Fig. 4 is a plan view, partly in section, of a plurality of friction elements for transmission of power from a driving shaft to a driven shaft.

The driving element may be of any desired form. In the drawings, the driving element 4 is shown operatively connected with a driving shaft 5, by any suitable means, such as a sprocket chain 6 which is engaged by sprockets 7, 8, on the roller shaft 9 and driving shaft 5, respectively.

A scraper beam is illustrated at 10 and this beam is suitably mounted for angular adjustment with relation to its supporting frame 11, and is also capable of movement out of contact with the road surface for transportation purposes.

A driven element, such as the driven shaft 12, which is shown carrying a drum 13, may be suitably mounted on the frame, and a cable 14 may extend from a suitable connection on the beam 10 to be wound on the drum 13 for raising and lowering the beam, and retaining the beam in predetermined positions with relation to the frame 11. If desired, an additional driven shaft 12$^a$ may be interposed between shaft 12 and shaft 5 and operatively connected with said shafts.

The driven shaft 12 is shown journaled in a bearing 15 at the forward portion of the frame 11, and a bearing 16 at the rearward portion of the frame, whereby the driven shaft 12 may be mounted longitudinally of the frame.

The driving shaft 5 is shown extending transversely across the frame and may be mounted in suitable journals 17. This shaft 5 is shown provided with a friction element 18 which may be in the form of a beveled or truncated bearing wheel of any suitable material. In Fig. 4 the friction elements are indicated at 18, 19. The contacting surfaces of the elements 18, 19 may be composed of laminated fiber, indicated at 20, which is shown retained in position by clamping plates 21, 22 and the bolts 23. The friction element of pulley 19 may be positioned on the shaft 5, while the friction pulley 18 may be positioned on the driven shaft 12, or upon an intermediate shaft 12$^a$. In the event of the use of the intermediate shaft 12$^a$, any suitable means, such as the sprocket chain 12$^b$, may be employed to operatively connect shaft 12 with shaft 12$^a$. If desired, the shaft 12 may be provided also with a hand wheel 24 to rotate the shaft when the traction means is not in operation, or where no other means to rotate the shaft are employed.

Suitably mounted upon a part 25 of the frame 11 is a bracket or other suitable supporting means 31, to which may be fulcrumed a lever 32. This lever is shown provided with a link 33 which engages a collar 34, and which collar is slidably mounted on the shaft 12 or 12ª. If desired, the shaft 12, or 12ª, may be retained in a position so that its friction element 18 is maintained out of engagement with the driving shaft friction element 19, and this may be effected by providing a resilient member 35 between a journal bearing 16 for the shaft and a collar 37 secured to the shaft.

It is obvious that a driven shaft 12 may be employed for each scraper beam 10, whereby an operator can direct the movements of the scraper beams from a platform on the frame by manipulation of the levers 32 to bring the friction elements 18 of shafts 12, or 12ª, into frictional contact with the friction elements or pulleys 19 of shaft 5 for moving a plurality of scraper beams, or the adjustment of a single scraper beam.

While the friction elements 18, 19 are described as having a bearing surface formed of laminated material, it is to be understood that the invention is not limited to the particular form of friction device illustrated and described, as the right is reserved to make such changes and alterations in the various parts and elements of the invention as fairly fall within the scope of the appended claims.

Having thus described my invention, what I claim as new and desire to secure by Letters Patent, is:—

1. In a device of the class described, a driving shaft, an intermediate driven shaft provided with means to transmit power to the driven shaft, said driving shaft and intermediate shaft being provided with coöperating frictional transmission instrumentalities, and another driving shaft superimposed above and having means to operatively connect the same to the first-named driving shaft, and means to effect a longitudinal movement of the intermediate driving shaft to transmit motion from the driving shaft to the superimposed driven shaft.

2. In a device of the class described, an intermediate driven shaft, a driven shaft superimposed above and parallel with the intermediate driven shaft, means to connect the intermediate shaft with the superimposed driven shaft, a driving shaft, means to transmit motion from the driving shaft to the intermediate shaft, a lever having means to engage the intermediate shaft and move the same toward the driving shaft, coöperative frictional engaging means carried by the driving shaft and the intermediate shaft, each of said frictional means having beveled engaging faces, and resilient means to retain the intermediate shaft in a predetermined position with the beveled face of its frictional engaging means out of contact with a similar face of the other frictional engaging means on the driving shaft.

3. In a device of the class described, a driven shaft having a frictional element mounted thereon, which element is provided with an inclined bearing face, a journal bearing for said shaft, a collar positioned on the shaft, a resilient element between said collar and said journal bearing, a driving shaft having a friction element provided with an inclined bearing face to coöperate with the bearing face of the friction element of the driven shaft, said resilient element operating on the driven shaft to maintain said friction elements out of engagement with each other, and a lever provided with means to engage said collar to move said driven shaft against the action of said resilient element to bring the friction elements into operative engagement.

4. In a device of the class described, a driving shaft having a beveled friction disk mounted thereon, an intermediate driven shaft having a beveled friction disk mounted thereon, a lever to shift said shaft longitudinally to move its friction disk into and out of engagement with the friction disk of the driving shaft, means to maintain the shiftable intermediate shaft in one position when not acted upon by the lever, another driving shaft superimposed above the intermediate shaft, and flexible means to connect said intermediate shaft with the superimposed shaft to permit of the longitudinal movement of the intermediate shaft without affecting the coöperative relation between said shafts.

In testimony whereof, I affix my signature, in presence of two witnesses.

CHARLES H. JONES.

Witnesses:
 IRA BULSON,
 HARRY S. BEST.

Copies of this patent may be obtained for five cents each, by addressing the "Commissioner of Patents, Washington, D. C."